(12) United States Patent
Merrick et al.

(10) Patent No.: US 6,328,379 B1
(45) Date of Patent: Dec. 11, 2001

(54) VEHICLE RESTRAINT SYSTEM WITH SLIDABLE SEAT

(75) Inventors: David D. Merrick, Cicero; James R. Chinni, Noblesville, both of IN (US)

(73) Assignee: Indiana Mills and Manufacturing, Inc., Westfield, IN (US)

( * ) Notice: Subject to any disclaimer, the term of this patent is extended or adjusted under 35 U.S.C. 154(b) by 0 days.

(21) Appl. No.: 09/528,744

(22) Filed: Mar. 20, 2000

(51) Int. Cl.$^7$ ........................................................ B60N 2/42
(52) U.S. Cl. ............................................................. 297/216.1
(58) Field of Search .............................. 297/452.2, 216.1, 297/216.15, 248, 216.13, 216.14, 216.16, 216.18, 464, 413

(56) References Cited

U.S. PATENT DOCUMENTS

| | | | |
|---|---|---|---|
| 3,145,051 | * | 8/1964 | Rausch . |
| 3,552,795 | * | 1/1971 | Perkins et al. . |
| 5,567,006 | * | 10/1996 | McCarthy . |
| 5,735,574 | * | 4/1998 | Serber . |
| 6,027,167 | * | 2/2000 | Blomdell et al. . |

* cited by examiner

*Primary Examiner*—Milton Nelson, Jr.
(74) *Attorney, Agent, or Firm*—Woodard, Emhardt, Naughton, Moriarty & McNett

(57) ABSTRACT

A vehicle seat having a back portion bent or deformed forwardly when impacted from the rear by a passenger. A horizontally movable seat platform is slidably mounted to the seat frame and has lap belts secured thereto. The seat platform is normally held in an aft position by fastening devices which break under forward passenger force applied through the lap belts to the movable platform during a crash. The movable platform includes a plurality of sleeves affixed thereto which are slidably mounted to the main frame of the seat.

15 Claims, 3 Drawing Sheets

VEHICLE RESTRAINT SYSTEM WITH SLIDABLE SEAT

BACKGROUND OF THE INVENTION

The present invention relates generally to the field of vehicle restraint systems including belts for securing an occupant to a seat.

DESCRIPTION OF THE PRIOR ART

School bus passenger seats usually do not employ active restraint safety devices, but instead rely on a passive restraint seat design. School bus passenger seats are built to specifications conforming to the safety standards set by the National Highway Traffic Safety Administration, DOT. These are codified as 49 C.F.R. Ch.V, § 571.222, Standard No. 222, and require that the seat back bend or deflect forward when a force is applied to the rear of the seat back. The code further specifies that 4000W inch-pounds of energy must be absorbed within a maximum forward deflection of the seat back of 14 inches and 2800W inch-pounds be absorbed within a maximum rearward deflection of the seat back of 10 inches where W represents the number of seating positions for which the seat is designed. 49 C.F.R., Ch.V, § 571.222, S5.1.3-5.1.4. The code specifies a passive restraint system, and does not require any sort of active restraints, such as a two-point passenger restraining lap belt or a three-point passenger restraining lap belt and torso harness combination. Children riding the school bus are protected in head-on collisions by the seat back in front of them deflecting forward and absorbing some of their forward momentum.

Vehicles with deforming or deflecting seats provide special problems regarding the integration of active restraint seat belt systems. Passive restraint systems are designed to protect a passenger who has been thrown forward by having the impacted seat back deflect upon impact of the thrown passenger and absorb some of their momentum. In a school bus seat combining active and passive restraint systems, both of the restraint systems have to be able to perform their functions and the seat must still conform to the regulations set forth in 49 C.F.R.

In order to combine a deforming or deflecting seat with a seatbelt, we have mounted the belt to a portion of the seat which slides forward upon crash and away from the forwardly deforming seat back. Thus, the seat conforms with the aforementioned deflecting requirements but in addition includes a belt for securing the occupant to the seat.

SUMMARY OF THE INVENTION

One embodiment of the present invention is a seat mountable in a vehicle including a main frame mountable to the vehicle. The main frame has a seat frame and a back frame connected together. A vehicle seat is movably mounted to the seat frame and has a normal aft position on the seat frame and a forward position on the seat frame. The vehicle seat when occupied is movable from the normal aft position to the forward position only during crash. A lap belt is mounted to the vehicle seat and is movable therewith. The back frame remains generally upright and stationary during crash unless impacted behind by a passenger.

DESCRIPTION OF THE PREFERRED EMBODIMENT

Figure 1:
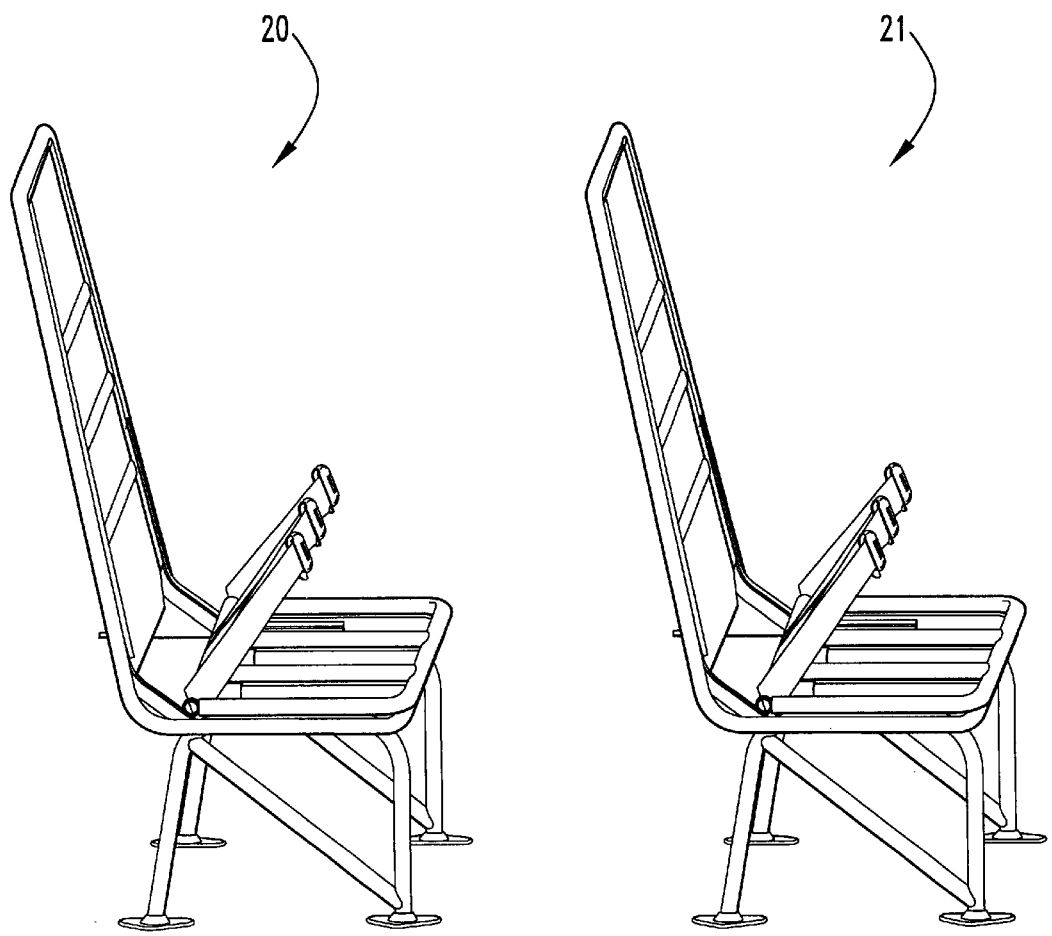
FIG. 1 is a side perspective view of a pair of seats arranged in a row incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a pair of identical bench style seats 20 and 21 typically used in a school bus. Each seat is sized to receive multiple occupants with a separate lap belt provided for each occupant. The seats have a tubular construction with the back of the seat being forwardly deformable or deflectable upon rear impact by a passenger located behind the seat back. The seat portion of the vehicle seat extends generally horizontally and is constructed to slide forward with the lap belts securing the occupants thereto during crash and as the seat back deforms forwardly.

Seat 21 will now be described it being understood that an identical description applies to seat 20. The exact construction of seat 21 may vary; however, in the embodiment shown in FIGS. 2 and 3, the chair includes a main frame 22 forming a back portion 23 and a seat portion 24. The main frame has a tube 25 including opposite and downwardly extending tubular portions 27 and 28 extending from the top 26 of the chair to the bottom 29 of the back 23. Tube 25 has a pair of forwardly extending tubular portions 30 and 31 located on the opposite sides of the seat portion of the chair with the opposite ends of portions 30 and 31 joined at location 32 at the center and front end of the seat.

A pair of left legs 33 and 34 and a pair of right legs 35 and 36 extend downwardly from the frame and are secured to the vehicle floor. The top ends of legs 33 and 34 are joined to a horizontally extending tubular portion 37, in turn, secured to tubular portion 30 of tube 25. Likewise, the top ends of legs 35 and 36 are joined to the opposite end portions of a horizontally extending tubular portion secured to tubular portion 31.

A diagonal brace 38 has a bottom end fixed to the bottom portion of leg 34 and a top end 39 secured to downwardly extending portion 27 of tube 25. A similar diagonal brace 40 has a bottom end fixed to the bottom portion of leg 36 and the top end secured to portion 28 of tube 25.

A web 41 is secured to the top 26 and portions 27 and 28 of tube 25 forming the seat back portion of the seat. The entire seat back portion is enclosed within suitable upholstery.

The seat portion of the vehicle seat includes, in addition to portions 30 and 31 of tube 25, a cross member 41 (FIG. 3) having opposite ends joined to diagonal braces 38 and 40 or portions 30 and 31 of tube 25. A pair of stationary members 42 and 43 have first ends fixed to cross member 41 and opposite ends fixed to the opposite end portions 44 and 45 of tube 25.

Movable frame 46 is slidably mounted to stationary members 42 and 43. Frame 46 includes side tubular portions 48 and 49 having front-end portions joined to cross member 50 and aft end portions joined to cross member 51. Two interior tubular members 52 and 53 extend between and are joined to cross members 50 and 51. Fixedly mounted to and depending from tubular portions 52 and 53 are respectively sleeves 54 and 55 through which respectively stationary members 43 and 42 extend. Sleeves 54 and 55 are freely slidable upon members 43 and 42 allowing movable frame 46 to slide from the rearward or aft position depicted in FIG. 2 to the most forward position depicted FIG. 3.

Figure 2:
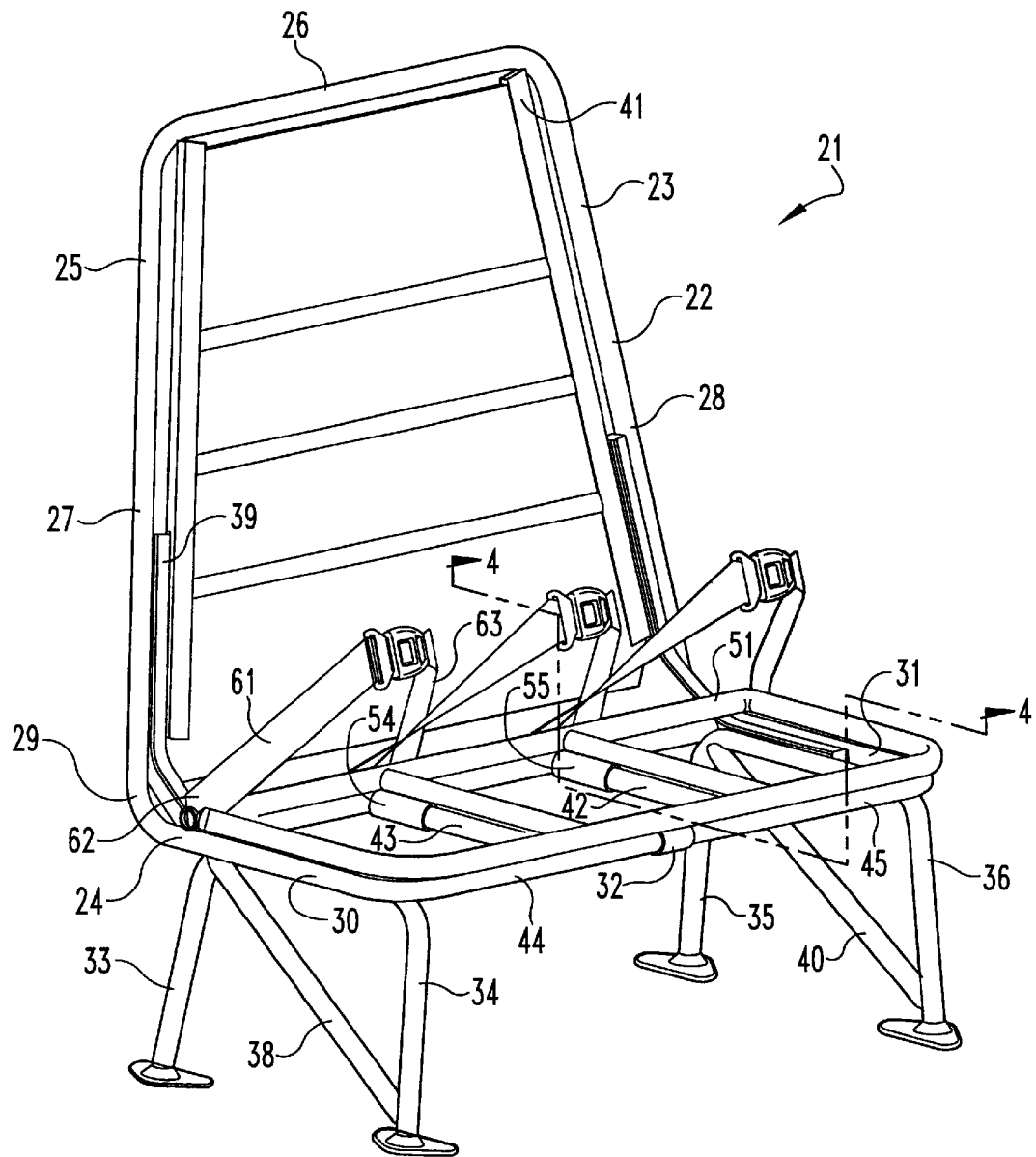
FIG. 2 is a front perspective view of one of the seats of FIG. 1.

In the embodiment of the seat depicted in FIG. 2, the seat is sufficiently wide to hold three occupants. Thus, three lap belts have their proximal ends attached to cross member 51 with the distal ends having mating tongue and buckle combinations. For example, belts 61 and 63 have their proximal ends 62 secured to member 51 with the outer or distal ends having respectively a buckle and mating tongue. Thus, the lap belts move with the occupant as the movable frame 46 slides from the aft position of FIG. 2 to the forward position of FIG. 3.

Figure 4:
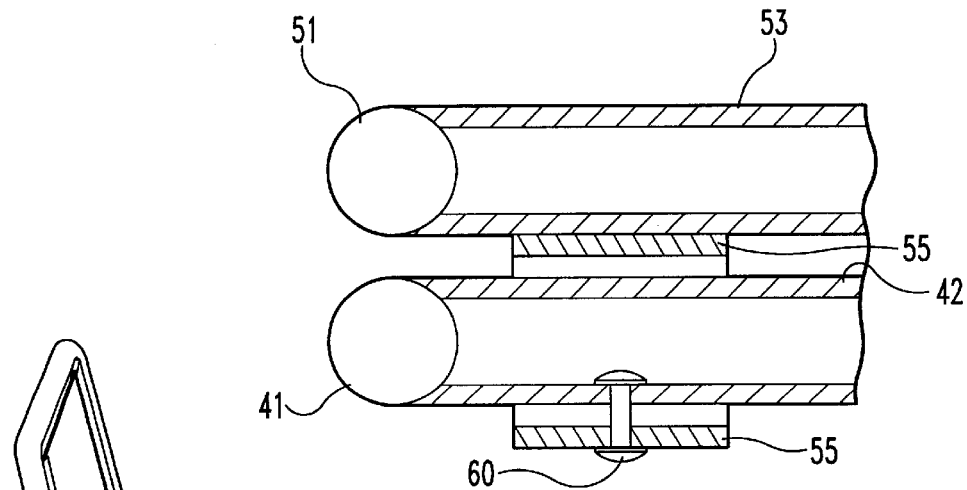
FIG. 4 is an enlarged, fragmentary cross sectional view taken along the line 4—4 of FIG. 2 and viewed in the direction of the arrows.
Figure 3:
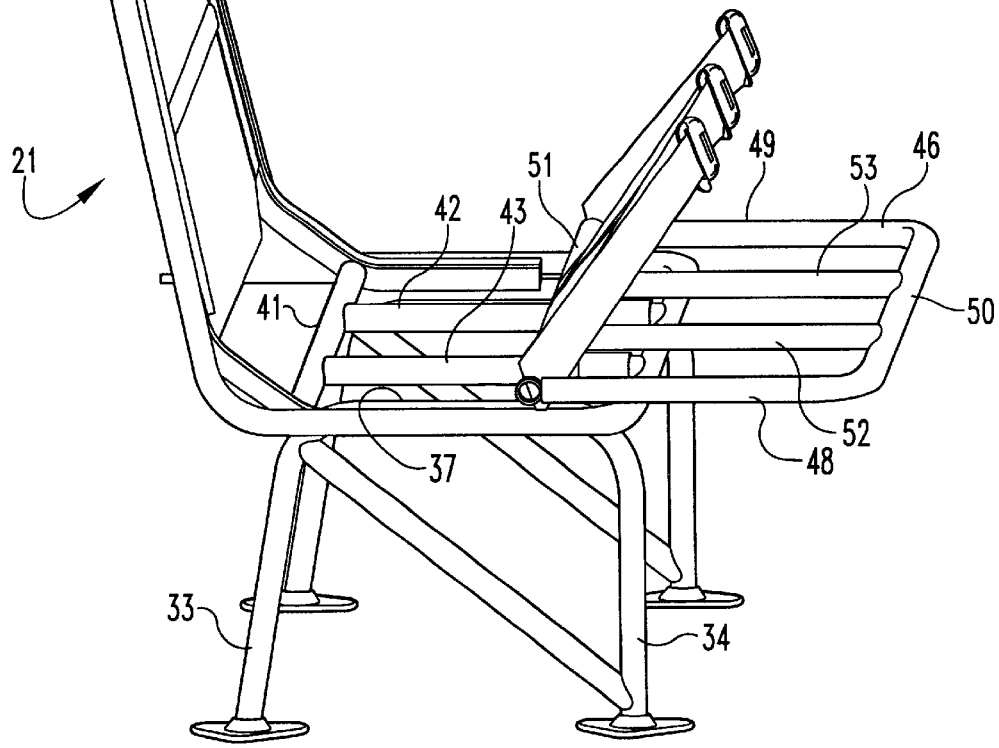
FIG. 3 is a side perspective view of one of the seats of FIG. 1 only with a portion of the seat and belt moved to the most forward position during crash.

Sleeves 54 and 55 are slidably mounted to tubes 43 and 42 but include fastening means for securing the sleeves and movable platform in the most aft position as depicted in FIG. 2. The fastening means may include conventional fasteners, such as, rivets or shear pins. In the embodiment depicted in FIG. 4, rivet 60 has a shank extending through the adjacent side walls of sleeve 55 and tube 42 with the opposite headed ends of the rivet being positioned within tube 42 and external to sleeve 55. Sleeve 55 and platform 46 are normally held in the aft position by rivet 60. Upon crash, forward force may be applied by the occupant to the lap belts urging movable frame 46 forwardly while the main frame of the seat remains fixed to the vehicle floor. Upon application of sufficient force, rivet 60 shears allowing the movable frame 46 with occupant to move to the most forward position as depicted in FIG. 3. Simultaneously, a passenger sitting on seat 20 behind seat 21 may impact on back frame 22 bending the frame forwardly to be in accordance with the aforementioned regulations. A similar rivet secures sleeve 54 to tube 43 and is shearable in the same fashion as rivet 60.

A suitable upholstery material is provided on movable frame 46 and seat frame 24. Further, a planar member, such as a wooden sheet may be attached to movable frame 46 and positioned immediately therebeneath to provide a smooth surface to slide atop portions 44 and 45 of tube 25.

Many advantages of the present invention are provided over the prior art. For example, the seats designed in accordance with the aforementioned federal regulations provide a protective envelope in the event of a crash with the occupant striking the cushion back surface of the seat in front of the occupant. By the addition of the seat belts and the movable seat frame, the occupants on the movable frame are further restrained.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A seat mountable in a vehicle comprising:
a main frame mountable in a vehicle;
a vehicle seat slidably mounted on said frame;
a seat belt mounted to said vehicle seat and slidably therewith;
means connected between said frame and said vehicle seat and operable to normally retain said vehicle seat in a aft position on said frame but yieldable when said vehicle seat is occupied to allow said vehicle seat to move upon vehicle crash to a forward position with said seat belt; and,
a seat back provided on said frame, said seat back remaining stationary as said vehicle seat slides forward during vehicle crash unless said seat back is impacted from behind by a passenger and pushed forwardly with said seat back restraining said passenger.

2. The seat of claim, 1 wherein:
said main frame includes a stationary seat frame and said vehicle seat includes a slidable seat frame slidably mounted to said stationary seat frame.

3. The seat of claim 2 wherein:
said means includes shear pins connecting said stationary seat frame and said slidable seat frame together until sheared upon vehicle crash.

4. A plurality of seats arrangeable in a row in a vehicle comprising:
a plurality of main frames arrangeable in a row in a vehicle, said main frames include seat frames and back frames connected together;
a plurality of vehicle seats slidably mounted to said seat frames and each having a normal aft position on said seat frames and upon vehicle crash a forward position on said seat frames, said vehicle seats when occupied slidable from said normal aft position to said forward position;
a plurality of lap belts mounted to said vehicle seats and slidable therewith; and,
a plurality of seat backs each mounted to each of said back frames, said seat backs remaining upright and stationary during crash unless impacted behind by a passenger on a vehicle seat therebehind which has moved from said aft position.

5. The seats of claim 4 and further comprising:
means extending between said seat frames and said vehicle seats operable to normally retain said vehicle seats in said aft position but yieldable when said vehicle seat is occupied to allow said vehicle seats to move upon vehicle crash to said forward position.

6. The seats of claim 4 and further comprising:
a device for holding said vehicle seats in said aft position until crash force is applied thereto by passengers residing on said seats.

7. The seats of claim 4 wherein:
said seat frames include a plurality of tubular members and said vehicle seats include a plurality of mating members slidably mounted on said tubular members.

8. The seats of claim 7 wherein:
said back frame includes a plurality of back members extending generally upright and stationary but bendable upon crash force being applied by a passenger located therebehind.

9. The seats of claim 7 further comprising:
a plurality of shear devices extending between and connecting together said tubular members and said mating members, said devices shearing upon crash force applied by passengers sitting on said vehicle seats.

10. A seat mountable in a vehicle comprising:

a main frame mountable in a vehicle, said main frame includes a seat frame and a back frame connected together;

a vehicle seat movably mounted to said seat frame and having a normal aft position on said seat frame and upon vehicle crash a forward position on said seat frame, said vehicle seat when occupied movable from said normal aft position to said forward position only during crash;

a lap belt mounted to said vehicle seat and movable therewith; and, a seat back mounted to said back frame, said seat back remaining generally upright and stationary during crash unless impacted behind by a passenger.

11. The seat of claim 10 wherein:

said vehicle seat and said seat frame includes breakable members extending therebetween fixing said vehicle seat in said aft position to said seat frame until said members break upon crash allowing said vehicle seat to move to said forward position.

12. The seat of claim 10 wherein:

said vehicle seat and said seat frame associated together in said aft position but movably relative to each other upon crash.

13. The seat of claim 12 wherein:

said seat back includes members extending generally upright until impacted from behind and deformed forwardly.

14. The seat of claim 10 wherein:

said seat frame includes a plurality of generally horizontally extending members to which said lap belt is connected; and, said vehicle seat includes a plurality of generally horizontally extending portions positioned atop and slidable on said members from said aft position to said forward position upon crash.

15. The seat of claim 14 and further comprising:

devices extending between and connecting one of said members to one of said portions limiting movement between said members and said portion.

* * * * *

UNITED STATES PATENT AND TRADEMARK OFFICE
CERTIFICATE OF CORRECTION

PATENT NO. : 6,328,379 B1
DATED : December 11, 2001
INVENTOR(S) : David D. Merrick, James R. Chinni and Michael E. Leakey It is certified that error appears in the above-identified patent and that said Letters Patent is hereby corrected as shown below:

<u>Title page,</u>
Item [75], please delete "both" and insert -- all --.
Please add the following inventor: -- Michael E. Leakey, Noblesville --

Signed and Sealed this

Eighteenth Day of June, 2002

*Attest:*

*Attesting Officer*

JAMES E. ROGAN
*Director of the United States Patent and Trademark Office*